April 16, 1957 H. BORKAN ET AL 2,789,157

COLOR PICK-UP TUBE COLOR STRIP CROSS-TALK COMPENSATION

Filed Sept. 1, 1955 4 Sheets-Sheet 1

INVENTORS
PAUL K. WEIMER
& HAROLD BORKAN
BY Olin L. Mitchell
ATTORNEY

COLOR PICK-UP TUBE COLOR STRIP CROSS-TALK COMPENSATION

Filed Sept. 1, 1955 4 Sheets-Sheet 2

INVENTORS
PAUL K. WEIMER
& HAROLD BORKAN
BY
ATTORNEY

April 16, 1957 H. BORKAN ET AL 2,789,157

COLOR PICK-UP TUBE COLOR STRIP CROSS-TALK COMPENSATION

Filed Sept. 1, 1955 4 Sheets-Sheet 3

INVENTORS
PAUL K. WEIMER
& HAROLD BORKAN
BY
ATTORNEY

April 16, 1957 H. BORKAN ET AL 2,789,157

COLOR PICK-UP TUBE COLOR STRIP CROSS-TALK COMPENSATION

Filed Sept. 1, 1955 4 Sheets-Sheet 4

INVENTORS
PAUL K. WEIMER
& HAROLD BORKAN
BY [signature]
ATTORNEY

United States Patent Office 2,789,157

Patented Apr. 16, 1957

2,789,157

COLOR PICK-UP TUBE COLOR STRIP CROSS-TALK COMPENSATION

Harold Borkan, New Brunswick, and Paul K. Weimer, Princeton, N. J., assignors to Radio Corporation of America, a corporation of Delaware Application September 1, 1955, Serial No. 531,968

6 Claims. (Cl. 178—5.4)

Figure 1:
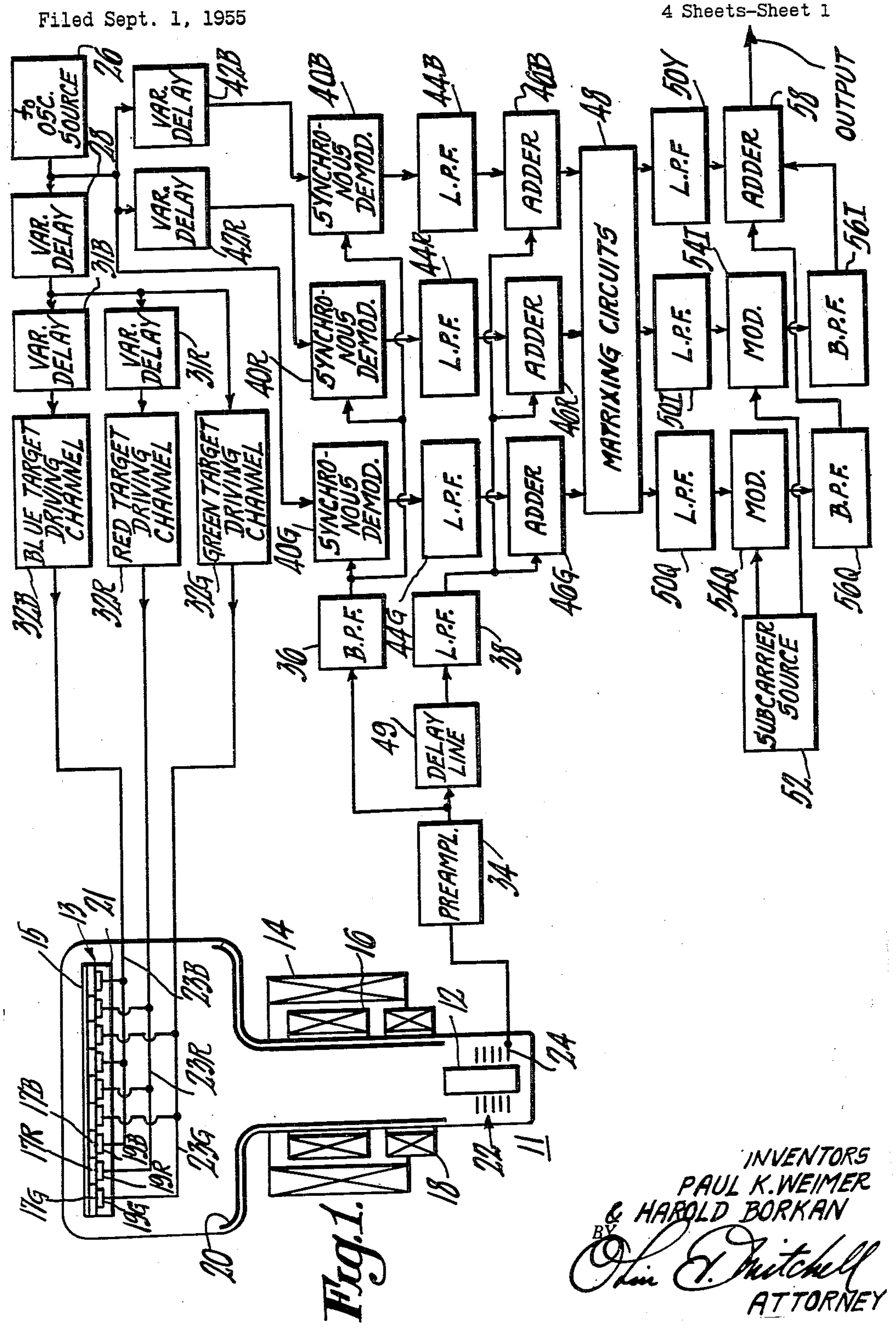

This invention relates to color television, and particularly to novel color television pickup systems utilizing a single camera tube to produce a plurality of simultaneous component color signals.

Simultaneous color television cameras of the single pickup tube type have been proposed utilizing a series of different optical filter strips in a recurring sequence to separate the light from a subject image into its color components as imaged upon the pickup tube target. In one form of such simultaneous color camera tubes, as described in the co-pending application of P. K. Weimer, Ser. No. 344,497 (RCA 36,277), filed March 25, 1953, and entitled "Cathode Ray Tube and Target," a target structure is provided comprising: a glass base; a plurality of red, green and blue optical filter strips deposited thereon and interleaved in a predetermined sequence; a plurality of optically transparent, electrically conductive strips laid down on the filter strips such that each conductive strip is superimposed upon a respectively different one of the filter strips; a substantially continuous layer of photoconductive material, such as porous antimony sulphide, overlaying the conductive strips; and respective leads or bus bars interconnecting the conductive strips of like color response.

The present invention relates to a novel pickup system utilizing a pickup tube having a target structure of the type described above. In accordance with the present invention a pickup tube of this character is operated such as to provide the desired component color and brightness information in its return beam signal, which may be derived from conventional electron multiplier apparatus incorporated in the tube structure. In accordance with an embodiment of the present invention different phases of a relatively high frequency oscillatory wave are employed to "drive" the respective conductive strip sets of the target structure. Respective synchronous detectors, supplied with respectively appropriate phases of the relatively high frequency "driving" signal, recover from the return beam signal respective color-difference signals containing information concerning the desired different component color aspects of the subject image. A brightness signal is also recovered from the return beam signal by suitable low pass filter apparatus. The brightness information is combined with the respective color difference signals to obtain the desired set of simultaneous component color signals. Use of the present invention thus achieves generation of a set of simultaneous component color signals of highly satisfactory signal-to-noise ratio utilizing a single pickup device.

A primary object of the present invention is thus to provide a novel and improved color television pickup system.

A further object of the present invention is to provide a novel color television camera utilizing a single pickup device to produce a plurality of simultaneous component color signals.

Other objects and advantages of the present invention may be readily ascertained upon a reading of the following detailed description and an inspection of the accompanying drawings in which:

Figure 1 illustrates in block and schematic form a color television pickup system embodying the principles of the present invention.

Figure 2A:
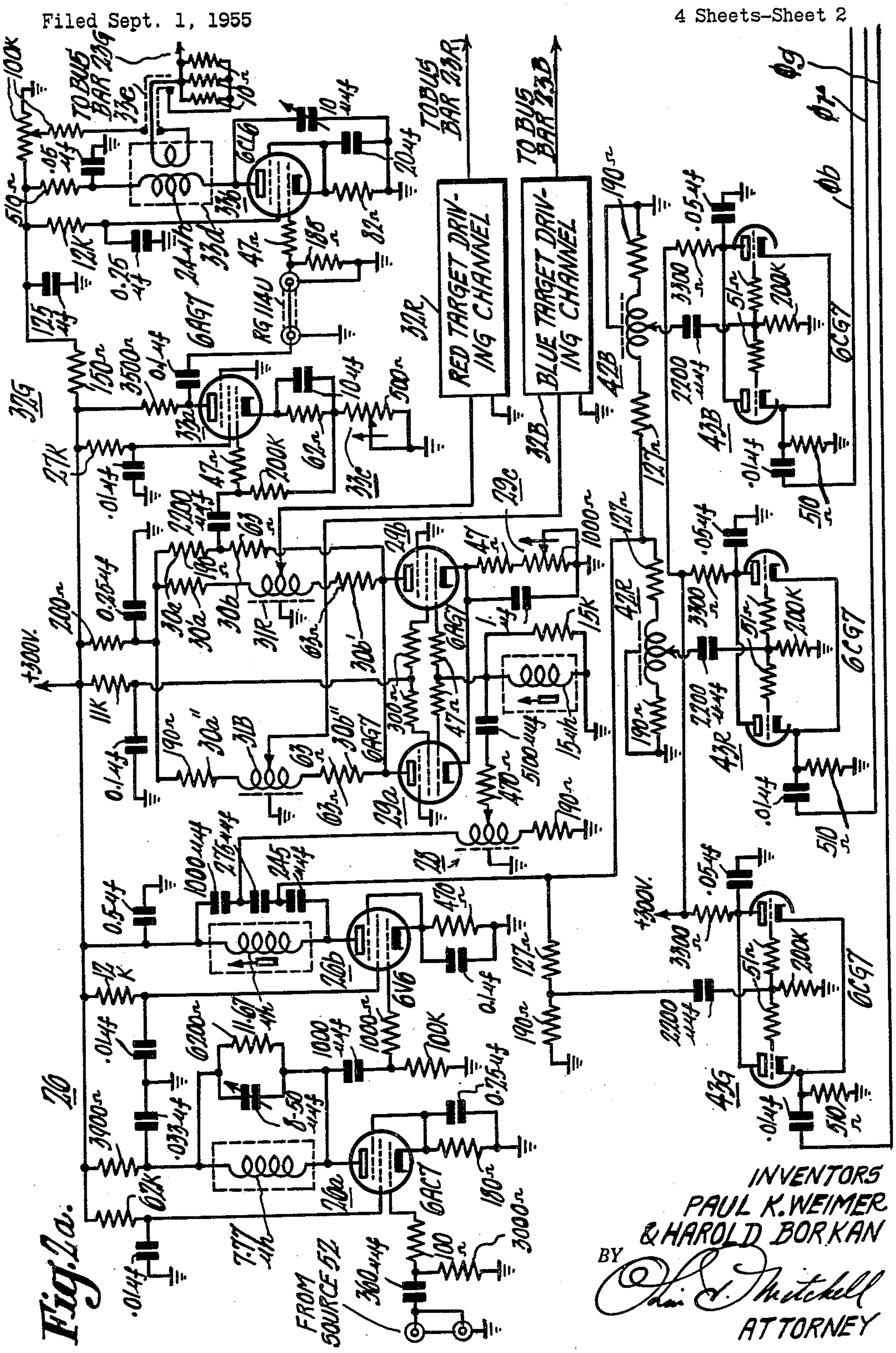
Figure 2B:
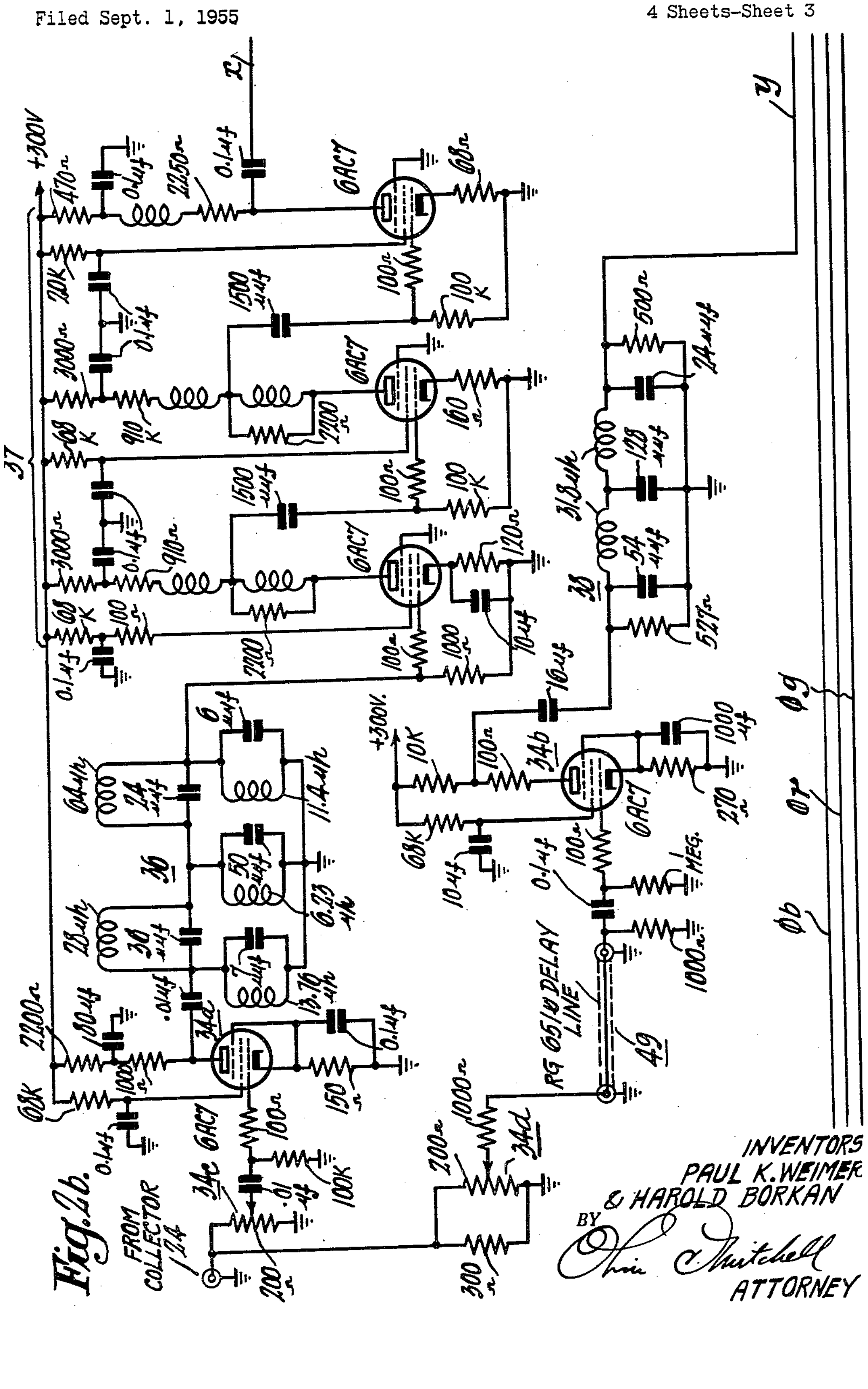
Figure 2C:
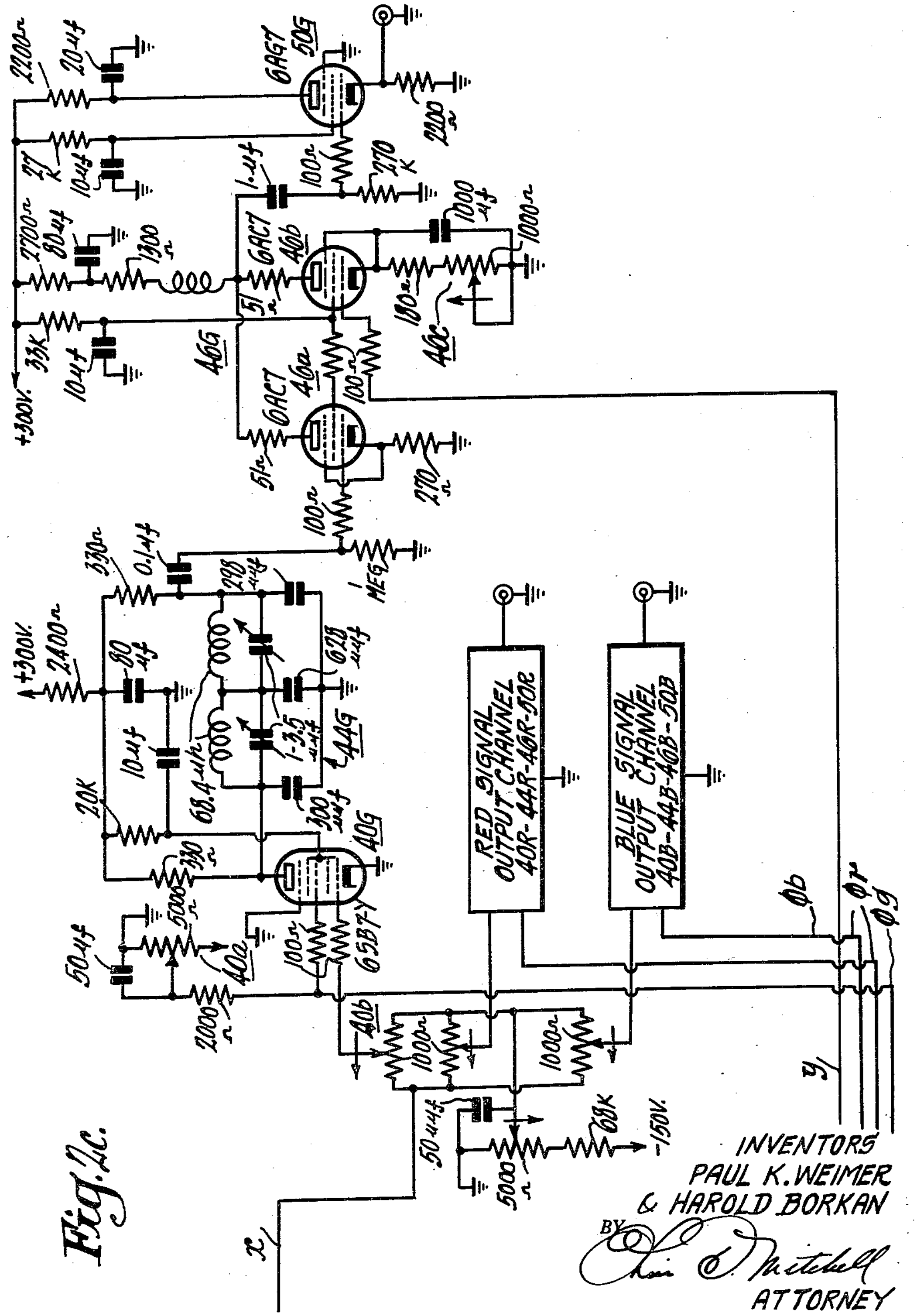

Figures 2*a*, 2*b* and 2*c* illustrate a portion of the pickup system of Figure 1 in greater schematic detail in accordance with a particular embodiment of the present invention.

Referring more particularly to Figure 1, there is illustrated a color pickup tube 11 incorporating a target structure 13 of the previously mentioned photoconductive type, comprising a glass base 15, interleaved red, green and blue optical filter strips 17R, 17G and 17B, respectively deposited thereon, respective electrically conductive strips 19R, 19G and 19B superimposed upon the respective filter strips, a substantially continuous layer 21 of photoconductive material overlaying the conductive strips, and respective leads or bus bars 23R, 23G and 23B interconnecting the conductive strips of like color filter association.

The tube 11 is provided with a conventional electron gun 12, which may include the usual cathode, control electrode and one or more accelerating electrodes which are connected to operating potential sources in a well-known manner. Means are provided for focusing the electron beam developed by electron gun 12 and for deflecting the beam to develop a conventional scanning raster at the target 13. These means may include a focusing coil 14 and a deflection yoke 16; an alignment coil 18 may additionally be provided. A fine mesh screen electrode (not shown) permeable to the electron beam may be positioned adjacent to the target 13 and suitably energized for utilization together with the focus coil 14 to insure that the beam in its final approach to the surface of target 13 is substantially normal thereto. A final accelerating electrode 20 may take the form of a conductive coating on the interior of the envelope of the tube 11.

The pickup tube 11 is additionally provided with an electron multiplier structure 22 at the electron gun 12 end of the tube. The function of the electron multiplier structure 22 in amplifying the signal contained in the "return beam" is well known from such uses as in the conventional image orthicon, and need not be discussed in detail herein. The electron multiplier structure 22 includes an output or collector electrode 24, from which the amplified return beam signal may be derived.

In accordance with the principles of the present invention, the circuitry associated with the color pickup tube 11 includes a source 26 of relatively high frequency sinusoidal oscillations. As an example, the frequency, $f_0$, of the oscillations provided by source 26 may be approximately 7.16 mc. The oscillations provided by source 26 are applied via a variable delay apparatus 28 to the inputs of three target driving channels 32G, 32R and 32B, whose outputs are applied to respectively different ones of the target strip-connecting bus bars (23G, 23R and 23B) of the pickup tube target structure 13. Two of the target driving channels (30R and 30B, in the example illustrated) are preceded by respective individual variable delay means (31R and 31B).

Amplified return beam signals derived from the collector electrode 24 of the electron multiplier structure 22 are applied to a preamplifier 34, the output of which is applied to both a bandpass filter 36 and to a lowpass filter 38. The passband of the bandpass filter 36 is centered about the frequency $f_0$, and may for example extend between limits of $f_0$—1.5 mc. to $f_0$+1.5 mc. The lowpass filter 38 may have a passband which encompasses the conventionally usable band of video frequencies, such as 0 to 4.2 mc. The return beam signal components selectively passed by bandpass filter 36 are applied to each of a plurality of synchronous detectors 40G, 40R and 40B. Each of the synchronous detectors 40 also receives $f_0$ oscillations from the source 26 in a respectively different phase. The desired phase differences may be effected, as indicated, by the inclusion of variable delay devices (42R and 42B) in the connections from source 26 to two of the detectors (40R and 40B).

The output of each synchronous detector is applied via a respective lowpass filter (44G, 44R and 44B) to an adder (46G, 46R and 46B) for combination with the signal passed by lowpass filter 38 (suitably delayed in delay means 49). The respective output signals of adders 46G, 46R and 46B each comprise information concerning a particular component color over a low frequency range determined by the passband of bandpass filter 36, and black and white information over the succeeding high frequency range.

It will be appreciated that the output signals of the adders 46 may readily be utilized in the formation of a standard color picture signal. As illustrated in Figure 1, such utilization may be effected through the use of suitable matrixing circuits 48 to mix the respective signals in the standard proportions to obtain the well-known Q, I and Y signals; and lowpass filters 50Q, 50I and 50Y to restrict in frequency the respective mixture signals to the bands of 0–0.5, 0–1.5, and 0–4.2 mc., respectively, in accordance with these standards. The outputs of lowpass filters 50Q and 50I modulate subcarrier frequency waves of appropriate phase quadrature relationship (derived from the subcarrier wave source 52) in respective modulators 54Q and 54I. The modulation products selected by bandpass filters 56Q and 56I, having appropriate passbands of 3–4.2 mc., and 2–4.2 mc., respectively, are combined in adder 58 with the Y signal output of lowpass filter 50Y to obtain the standard color picture signal.

Figures 2*a*, 2*b* and 2*c* illustrate a particular working embodiment of the present invention in schematic detail; the three schematic drawings are to be read together in viewing the overall system. Where possible, the same reference numerals used for block designations in Figure 1 are used to designate the corresponding schematically illustrated components of the particular system shown in Figures 2*a*, 2*b* and 2*c*. Turning attention first to the portion of the system illustrated in Figure 2*a*, it will be noted that the $f_0$ oscillation source 26 comprises a frequency doubler stage 26*a*, operating on the 3.58 mc. wave output of the subcarrier source 52 (not schematically illustrated), and feeding an output or driver stage 26*b*. It should be appreciated that while such an arrangement represents a convenient manner of deriving the desired $f_0$ oscillations, it is not requisite for satisfactory operation of the invention that the $f_0$ oscillations be so tied to the subsequently utilized subcarrier waves. The choice of $f_0$ may be made independent of the particular subcarrier frequency to be used in transmission, and no synchronous relationship need be maintained between the respective sources.

Oscillations at approximately 7.16 mc. are delivered by the output stage 26*b* via a master delay control, the variable delay line 28, to the grids of a pair of parallel buffer amplifiers 29*a* and 29*b*. It will be noted that the variable resistor 29*c* in the common cathode circuit of the amplifiers 29*a* and 29*b* provides a master gain control for the target driving signals.

The input end of the green target driving channel 32G is fixedly connected to a point intermediate a pair of resistors 30*a* and 30*b* connected between the buffer amplifier anodes and an anode potential supply lead. The input end of the red target driving channel 32R is connected to the adjustable tap of variable delay line 31R intermediate another pair of anode resistors 30*a'* and 30*b'* in a series combination shunting the first pair. The input end of the blue target driving channel 32B similarly is connected to the adjustable tap of variable delay line 31B intermediate another corresponding pair of anode resistors 30*a''* and 30*b''*.

Since the three target driving channels may be essentially identical, only one, the green target driving channel 32G, has been illustrated in schematic detail, block representations being adequate for the remaining two. It will be noted that the target driving channel 32G includes a pair of cascaded amplifying stages 33*a*, 33*b*, a channel gain control being provided by an adjustable resistor 33*c* in the cathode circuit of the input stage 33*a*. Coupling of the output stage 33*b* to the green target strip bus bar 23G is effected via a transformer 33*d* in the plate circuit of the output stage, the transformer secondary being connected to the bus bar 23G by means of a cable 33*e*, shunted by a trio of 10 ohm resistors. It will be appreciated that an exceptionally low output or driving impedance is thus provided for the target driving channel 32G, such impedance being of the order of 3 to 4 ohms. The reasons for providing such a low driving impedance will be discussed in some detail subsequently.

Also included in the system portion illustrated in Figure 2*a* are respective detector driver stages 43G, 43R and 43B, each comprising a pair of parallel connected triodes, and each supplied with a respectively different phase of the $f_0$ oscillation output of the source 26. The $f_0$ source output stage 26*b* is coupled to the control grids of the drivers 43R and 43B by means of respective variable delay lines 42R and 42B. The coupling of the output stage 26*b* to the input of driver 43G is, however, free of such delay devices.

In Figure 2*b*, a portion of the system which operates on the return beam signal of the pickup tube 11 is schematically illustrated. The signals derived from the collector electrode 24 of the pickup tube's electron multiplier structure 22 are applied to respective preamplifiers 34*a* and 34*b*. The output of amplifier 34*a* is applied to a bandpass filter 36, having a passband centered about $f_0$ (i. e. approximately 7.16 mc.) and encompassing a band of frequencies above and below $f_0$ of sufficient width to pass the highest useful color information frequency (i. e. encompassing a band of approximately 7.16±1.5 mc.). The filter output is further amplified in succeeding cascaded amplifying stages 37.

The output of amplifier 34*b* is applied to a low pass filter 38, which may for example have a passband of 0 to 5 mc. A delay line 49 of appropriate electrical length is provided in the coupling of the amplifier 34*b* to the electron multiplier collector 24. The purpose of providing this delay line, it will be seen, is to equalize the delay of the brightness signals in the low pass channel with the delay of the chrominance signals that are derived from the $f_0$ carrier and sidebands passed by the bandpass channel. It may also be noted that the input potentiometers 34*c* and 34*d* respectively associated with the amplifiers 34*a* and 34*b* provide respective master gain controls for the chrominance and luminance signals to be derived from the pickup tube system.

In Figure 2*c*, a simplification of the drawing has been effected, similar to that effected in Figure 2*a*, by showing in schematic detail only one of the respective color signal output channels (i. e. the green signal output channel 40G—42G—44G—46G—50G). The red and blue signal output channels (40R, 42R, etc. and 40B, 42B, etc.), which may be essentially identical with the schematically illustrated green signal channel, are adequately illustrated by block representation. In Figure 2*c*, a pentagrid tube serves as the green signal synchronous detector 40G, the output of the bandpass channel amplifier 37 being applied to the tube's first grid, and the output of the green detector driver 43G being applied to the tube's third grid. A variable resistor 40*a* in the third grid input circuit provides a so-called green "background" control, while a variable resistor 40*b* in the first grid input circuit provides a so-called green "chroma" control. A low pass filter 44G in the output circuit of synchronous detector 40G selects from the modulation products appearing at the detector output electrode the color-difference signal G–Y, passing the signal up to the limiting frequency of 1.5 mc. to an adder 46G for combination with the Y signal output of low pass filter 38. The adder 46G comprises a pair of amplifier tubes 46*a* and 46*b*, the plates of which are connected together at the adder output terminal. The output of low pass filter 44G is applied to the control grid of amplifier tube 46*a*, while the output of low pass filter 38 is applied to the control grid of amplifier tube 46*b*. A variable resistor 46*c* in the cathode circuit of amplifier 46*b* provides a black-and-white balance control for the green signal channel. The output terminal of adder 46 is coupled to the control grid of a cathode follower stage 50G, which comprises the output stage of the illustrated green signal channel.

Among the details briefly described above, the feature of providing an exceptionally low output or driving impedance for the target driving channels 32G, etc., bears further explanation. It may be appreciated that the interleaving of the conducting strips 19G, etc., in the target structure 13 inherently results in the existence of relatively high capacities between the respective strip sets. The cross coupling capacitances existing between respective strip sets may be of the order of approximately 600 μμf. in a representative tube of the character described. It will be appreciated that at the driving signal frequency $f_0$, illustratively 7.16 mc., the respective conducting strip sets are cross-coupled by reactances of very small magnitude. If driving channels having output impedances of a conventional order are utilized to drive the respective conducting strip sets with the differently phased $f_0$ oscillations, it will be readily appreciated that substantial cross-talk of the respectively phased driving signals will result, rendering efforts at color signal separation in the demodulators 40G, etc., ineffective. Therefore, as illustrated in Figure 2*a*, effort is made to provide the output stage of each target driving channel with an exceptionally low driving impedance, such impedance being of the order of 3 to 4 ohms for the apparatus therein illustrated.

Further attention may also be particularly directed to the arrangements illustrated in Figures 2*a* and 2*b* for controlling the phasing of the $f_0$ oscillations supplied to the target driving channels 32G, etc. and to the synchronous detectors 40G, etc. It will be noted that variable delay means 31B, 31R, individually associated with the blue and red target driving channels, respectively, provide sufficient control to insure that the respective blue, red and green target driving signals bear a desired phase relationship relative to one another. Such desired phase relationship may be symmetrical (i. e. 0°, 120°, and 240°, respectively) or asymmetrical (e. g. the subcarrier phase relationships expressed in the FCC signal standards).

Similarly, the variable delay means 42R and 42B provide sufficient control to insure that the respective reference signals supplied to the synchronous detectors 40G, etc., bear the correspondingly requisite phase relationships relative to one another. The master variable delay means 28, on the other hand, provides a simple unicontrol for shifting of the phases of the entire set of target driving signals so as to insure that the reference signal set delivered to the synchronous detectors 40G, etc. is in the proper synchronous relationship to said driving signal set as found in the return beam signal output supplied to the detectors via the bandpass filter 36.

While particular values of the circuit elements and particular tube types have been indicated in Figures 2*a*, 2*b* and 2*c*, it will be appreciated that these are given for the purpose of presenting a particular working example, and the present invention is not to be considered as restricted solely to the use of these particular values and types. In further delineation of the working example of Figures 2*a*, 2*b* and 2*c*, it may be noted that Advance Type 506 continuously variable delay lines may be satisfactorily utilized as the variable delay means 28, 31B, 31R, 42B and 42R.

Having described the invention, what is claimed is:

1. A color television camera comprising in combination a color image pickup device including an electron target structure, means for developing an electron beam, means for causing said beam to trace a scanning raster at said target structure, and means for collecting the electrons of said beam returned from said target structure throughout said raster tracing, said target structure comprising a plurality of interleaved sets of optical filter strips having respectively different component color passbands, a corresponding plurality of interleaved sets of conducting signal strips registered therewith, and a layer of photoconductive material; a source of relatively high frequency electrical oscillations; means for applying oscillations from said source to each of said conducting strip sets in a respectively different phase; means for preventing crossfeed of the respectively differently phased oscillations between the respective conducting strip sets through the cross-coupling impedances inherently existing between the respective conducting strip sets, said crossfeed preventing means comprising means for causing said oscillation applying means to present an output impedance to each of said conducting strip sets of an ohmic value lower than the ohmic value of said cross-coupling impedances at the frequency of said oscillations; a plurality of synchronous detectors; a bandpass filter having a passband centered about the frequency of said oscillations; means for applying the return beam signal appearing at said collecting means through said bandpass filter to each of said synchronous detectors; and means for applying oscillations from said source to each of said synchronous detectors in a respectively different phase.

2. A color television camera comprising in combination a color image pickup device including an electron target structure, means for developing an electron beam, means for causing said beam to trace a scanning raster at said target structure, and means for collecting the electrons of said beam returned from said target structure throughout said raster tracing, said target structure comprising a plurality of interleaved sets of optical filter strips having respectively different component color passbands and a corresponding plurality of interleaved sets of conducting signal strips registered therewith; a source of relatively high frequency electrical oscillations; means for applying oscillations from said source to each of said conducting strip sets in a respectively different phase, the output impedance presented by said oscillation applying means to each of said conducting strip sets being of the order of three to four ohms; a plurality of synchronous detectors; a bandpass filter having a passband centered about the frequency of said oscillations; means for applying the return beam signal appearing at said collecting means through said bandpass filter to each of said synchronous detectors; means for applying oscillations from said source to each of said synchronous detectors in a respectively different phase whereby the output of each of said synchronous detectors comprises a respectively different color-difference signal; a low pass filter coupled to said collecting means; a plurality of additional low pass filters; a plurality of signal adders; means for applying the output of said first-named low pass filter to each of said signal adders; and means for applying the output of each of said detectors through a respectively different one of said additional lowpass filters to a respectively different one of said signal adders whereby a respectively different component color signal may be obtained from the output of each of said signal adders.

3. A color television camera comprising in combination a color image pickup device including an electron target structure, means for developing an electron beam, means for causing said beam to trace a scanning raster at said target structure, and means for collecting the electrons of said beam returned from said target structure throughout said raster tracing, said target structure comprising a plurality of interleaved sets of optical filter strips having respectively different component color passbands and a corresponding plurality of interleaved sets of conducting signal strips registered therewith; a source of relatively high frequency electrical oscillations; means for applying oscillations from said source to each of said conducting strip sets in a respectively different phase; a plurality of synchronous detectors; a bandpass filter having a passband centered about the frequency of said oscillations; means for applying the return beam signal appearing at said collecting means through said bandpass filter to each of said synchronous detectors; means for applying oscillations from said source to each of said synchronous detectors in a respectively different phase whereby the output of each of said synchronous detectors comprises a respectively different color-difference signal; a low pass filter coupled to said collecting means; a plurality of additional low pass filters; a plurality of signal adders; means for applying the output of said first-named low pass filter to each of said signal adders; and means for applying the output of each of said detectors through a respectively different one of said additional low pass filters to a respectively different one of said signal adders whereby a respectively different component color signal may be obtained from the output of each of said signal adders; said first-named oscillation applying means comprising respective target strip set driving channels each having an output stage, respective means including a transformer for coupling each output stage to the respectively associated target strip set, each of said coupling means being such that the magnitude of the output impedance presented by the output stage is less than the magnitude of the cross-coupling impedances inherently existing between respective ones of said interleaved strip sets at said relatively high frequency.

4. Apparatus in accordance with claim 3 wherein the oscillations provided by said source are of substantially sinusoidal form, and the frequency thereof is substantially higher than the highest desired video output signal frequency.

5. A color television camera in accordance with claim 3 wherein said first-named oscillation applying means includes a plurality of variable delay means each having input and output terminals, means for applying the oscillations from said source to the input terminal of a first one of said plurality of variable delay means, means including respective ones of the remaining variable delay means for coupling the output terminal of said first variable delay means to the input of all but one of said target driving channels, and a coupling between said output terminal and the input of said one target driving channel involving relatively no signal delay.

6. A color television camera comprising in combination an image pickup tube including means for generating an electron beam, an electron beam target structure comprising a plurality of interleaved sets of conducting strips, means for causing said beam to trace a scanning raster upon said target structure, and means for collecting the electrons of said beam returned from said target structure during said raster tracing; a source of target driving signals, said driving signals having a predetermined, relatively high, driving signal frequency; respective means for coupling said driving signal source to each of said conducting strip sets, each of said coupling means presenting a driving impedance to the respectively associated conducting strip set which is substantially lower than the impedances presented at said driving signal frequency by the capacitances inherently existing between respective strip sets; a plurality of synchronous detectors; means for applying the return beam signal appearing at said collecting means to each of said synchronous detectors, said applying means having a bandpass characteristic centered about said driving signal frequency; and means for deriving respective reference signals from said driving signal source for application to respectively different ones of said synchronous detectors.

No references cited.